(12) United States Patent  
Munday

(10) Patent No.: US 10,893,665 B2
(45) Date of Patent: Jan. 19, 2021

(54) BIOACTIVE HONEY PRODUCTION ENVIRONMENT AND METHOD

(71) Applicant: David Munday, Ashmore (AU)

(72) Inventor: David Munday, Ashmore (AU)

(73) Assignee: David Munday, Ashmore (AU)

( * ) Notice: Subject to any disclaimer, the term of this patent is extended or adjusted under 35 U.S.C. 154(b) by 0 days.

(21) Appl. No.: 16/638,789

(22) PCT Filed: Aug. 14, 2018

(86) PCT No.: PCT/AU2018/050862
§ 371 (c)(1),
(2) Date: Feb. 13, 2020

(87) PCT Pub. No.: WO2019/033162
PCT Pub. Date: Feb. 21, 2019

(65) Prior Publication Data
US 2020/0178506 A1  Jun. 11, 2020

(30) Foreign Application Priority Data
Aug. 15, 2017 (AU) ................................ 2017903257

(51) Int. Cl.
*A01K 47/00* (2006.01)
*A01K 47/02* (2006.01)
(Continued)

(52) U.S. Cl.
CPC .............. *A01K 47/02* (2013.01); *A01K 47/04* (2013.01); *A01K 47/06* (2013.01); *A01K 53/00* (2013.01); *A01K 67/033* (2013.01)

(58) Field of Classification Search
CPC ........ A01K 47/02; A01K 47/04; A01K 47/06; A01K 47/00; A01K 53/00; A01K 67/033;
(Continued)

(56) References Cited

U.S. PATENT DOCUMENTS 2,128,000 A * 8/1938 King ..................... A01K 47/00
449/7
4,077,157 A    3/1978 Bradner
(Continued)

FOREIGN PATENT DOCUMENTS

RU    2299560 C2    5/2007

OTHER PUBLICATIONS

PCT International Search Report and Written Opinion, Application No. PCT/AU2018/050862, dated Nov. 19, 2018, 19 pps.
(Continued)

*Primary Examiner* — Kathleen I Alker
(74) *Attorney, Agent, or Firm* — Armstrong Teasdale LLP

(57) ABSTRACT

An artificially-created honey-yielding environment is established, including a hive and an associated flora cell, within which first and second plant populations cohabit. Within the cell, honey-producing insects from the hive are permitted to forage. One of the populations has been artificially introduced. The other may be indigenous to the cell. The first plant population serves as a primary source of nectar which yields bioactive honey and the second serves as a source of a nutrient, such as protein, which is not abundantly available from the first species at a nutritionally adequate level for sustaining the metabolism and energy of the foraging honey-producing insects for returning to the hive. The first flora population may be a *Leptospermum* species. An example of the second is *Corymbia maculata*.

10 Claims, 7 Drawing Sheets

(51) Int. Cl.
*A01K 47/04* (2006.01)
*A01K 47/06* (2006.01)
*A01K 53/00* (2006.01)
*A01K 67/033* (2006.01)

(58) Field of Classification Search
CPC ........ A01K 59/00; A23K 50/90; A23K 10/30;
A23K 20/00; A01G 9/00; A01G 9/14;
A01G 13/0231; A01G 13/04
See application file for complete search history.

(56) References Cited

U.S. PATENT DOCUMENTS

| | | | | |
|---|---|---|---|---|
| 4,346,490 | A | 8/1982 | Katz et al. | |
| 5,277,647 | A | 1/1994 | Earl | |
| 5,685,763 | A * | 11/1997 | Trafford | A01K 47/02 449/56 |
| 6,896,579 | B2 * | 5/2005 | Bromenshenk | A01K 15/02 449/2 |
| 2008/0072353 | A1 * | 3/2008 | Gibson | A01H 5/12 800/305 |
| 2018/0168130 | A1 * | 6/2018 | Wu | A01M 1/026 |

OTHER PUBLICATIONS

International Preliminary Report on Patentability, Application No. PCT/AU2018/050862, dated Dec. 11, 2019, 55 pps.
The Land, New venture in medical Manuka, Jamie Brown, dated Jun. 22, 2017, https://www.theland.com.au/story/4734666/manuka-comes-to-the-people/.
Plant Name Details, *Myrtaceae leptospermum polygalifolium* subsp. *tropicum* Joy Thomps., Telopea dated Dec. 8, 1989, https://www.somemagneticislandplants.com.au/11-botanical-names/1063-leptospermum-polygalifolium.
Doug Somerville, NSW Agriculture, "Honey & pollen flora suitable for planting in south-eastern NSW", Second edition, pp. 1-4, Revised Apr. 2002, https://www.dpi.nsw.gov.au/__data/assets/pdf_file/0010/117487/honey-pollen-flora-for-planting-nsw.pdf.
Everett Oertel, "Nectar & Pollen Plants", Beekeeping in the United States agriculture handbook No. 335, pp. 16-23, Revised Oct. 1980. http://beesource.com/resources/usda/nectar-and-pollen-plants/.
Annie Deutsch, University of Wisconsin—Extension, "The Honey Bee's Needs; Nectar and Pollen", pp. 1-27, dated Mar. 29, 2016., https://door.uwex.edu/files/2010/05/Deutsch-BeeKeeperTalk2.pdf.
Boffa Miskell Limited, "The Manuka & Kanuka Plantation Guide", pp. 1-78; referenced pp. 1, 21-24, 29, issued Apr. 2017, http://www.gw.govt.nz/assets/Manuka-plantation-guide-landcare-April2017.pdf.
Jonathan McD C Stephens, Thesis, The University of Waikato, "The factors responsible for the varying levels of UMF® in Manuka (*Leptospermum scoparium*) honey", pp. 1-268; referenced pp. 62, 72, dated Feb. 2006, http://www.tasmanianmanukahoney.com.au/wp-content/uploads/2013/10/WU-09-Manuka-Thesis.pdf.
The Australian Government Rural Industries Research and Development Corporation, Bee Friendly, A planting guide for European honeybees and Australian native pollinators, by Mark Leech, Published: Dec. 2012, https://www.agrifutures.com.au/wp-content/uploads/publications/12-014.pdf.
Nural N. Cokcetin, Matthew Pappalardo, Leona T. Campbell, Peter Brooks, Dee A. Carter, Shona E. Blair, Elizabeth J. Harry, "The Antibacterial Activity of Australian Leptospermum Honey Correlates with Methylglyoxal Levels", pp. 1-7, published Dec. 28, 2016, http://journals.plos.org/plosone/article?id=10.1371/journal.pone.0167780.
Justin Hughes "Guide for selecting the best Australian suited flowers and plants in benefit the bees, pollinators and your garden", pp. 1-21, posted on Mar. 29, 2015.

* cited by examiner

KEY

| H | HIVE COMPLEX |
| L | L. LIVERSIDGEI |
| P | L. POLYGALIFOLIUM |
| W | L. WHITEI |
| SXB | L/ SCOPARIUM X BARNEYENSE |

BIOACTIVE HONEY PRODUCTION ENVIRONMENT AND METHOD

CROSS REFERENCE TO RELATED APPLICATIONS

This patent application is a National Stage Entry of PCT/AU2018/050862 filed on Aug. 14, 2018, which claims priority to AU Application No. 2017903257 filed on Aug. 15, 2017, the disclosures of which are hereby incorporated by reference herein in their entirety as part of the present application.

FIELD OF THE DISCLOSURE

This disclosure relates to bioactive honey production and a flora cell from which nectar and pollen are collected. The disclosure is suitable for utilisation in indoor and outdoor environments and for bioactive honey production on an industrial scale.

BACKGROUND

Honey is a sweet, viscous food produced by bees and some related insects from sugary plant secretions. The molecule methylglyoxal (MGO) has been identified a major component contributing to the long-lasting antibacterial activity of honey derived from the plant species *Leptospermum*. MGO is not generally found in honeys from other plant sources. An MGO number represents MGO content in milligrams per kilogram of honey. For a honey to be considered bioactive, it must have an MGO number of at least +350. It is a widely recognized indicator of the level of bioactivity in *Leptospermum* honey and more recently in other species, for example *Eucalyptus*. Elevated bioactivity means elevated antimicrobial properties in the honey.

Bees and other honey-producing insects need two kinds of food: Nectar and pollen. From these they make honey. Bees gather nectar from plant species within foraging range of their hive. Specific types of honey having sought-after functional properties, such as elevated bioactivity, may be produced by locating a hive within range of chosen species known to provide the pollen and nectar yielding the desired honey type. To make a bioactive honey, a particular pollen protein is required. Different proteins result in honeys of differing properties. Honey is a form of food storage utilised by the bees, providing a source of nutrients, especially carbohydrates. Worker bees are observed to consume nectar pollen during the warmer months of the year, but this is far less available in the cooler months, therefore making honey storage necessary.

Bees require nutrition while collecting nectar and in flying back to the hive. When a nectar source is abundant, up to about 90% or the honey or pollen will come from that source. Some kinds of nectar, although having desirable properties for human and other use, do not have sufficient nutrients to sustain foraging bees, especially for the flight back to the hive.

Nectar from the species *Leptospermum polygalifolium* is valued for its medicinal functionalities, but its pollen is low in protein. Wild stands of *L. polygalifolium* therefore cannot satisfy the needs of bee species, such as the European honey bee, for returning to the hive after foraging—except within very close range. Other bee species, such as native Australian bees, may have a longer foraging range, but their honey output is a hundredfold lower than that of their European counterparts. Bees foraging in a *Leptospermum* forest, for example, may run the risk of energy depletion. Foraging areas therefore need to include plant species that provide energy so that the honey reserves in the hives can be maintained at a substantial level.

At least one prior publication describes the general concept of providing different plant species in an environment for bee fodder. None mentions a *Leptospermum* species, or the ratio in which different functional plants should be supplied. U.S. Pat. No. 5,277,647 (Earl) discloses a plantation layout, set out on a piece of cleared land and in which are planted a species of perennially flowering plants thereon. However, it does not disclose providing plants specifically to provide nutrition for bees.

An article by Somerville NSW Agriculture, "Honey & pollen flora suitable for planting in south-eastern NSW", Second edition, pages 1-4, Revised April 2002, rates a long list of plants according to their honey and pollen yields and flowering season. It begins by teaching that "By carefully selecting the species you may also produce an environment attractive to native birds and bees." It continues "It is doubtful whether enough flowering shrubs and trees can be planted on a farm or recreational activity area to be a major benefit to commercial beekeeping and recommends "Multiple plantings of a range of species". It does not suggest combining particular species for nectar and pollen. Nutrition is not mentioned.

U.S. Pat. No. 4,346,490 (Katz) proposes a honey-producing cell including vegetation and hives contained in a building.

Everett Oertel, in "Nectar & Pollen Plants", Beekeeping in the United States agriculture handbook number 335, pages 16-23, Revised October 1980 states that "A beekeeper must have available data on the nectar and pollen plants in the vicinity of his apiary". However, at the end of page 3/10, he observes that some beekeepers feed pollen supplements to their colonies. Oertel does not suggest that pollen supplementation can come from selecting particular plants for planting in close proximity to or with nectar yielding plants. Oertel also does not distinguish between nectar and pollen species, so does not address the problem of inadequate nutrition when bees venture beyond a critical range from their hive.

Justin Hughes, in a florist blog, Flowers for bees, "Guide for selecting the best Australian suited flowers and plants to benefit the bees, pollinators and your garden", pages 1-21, posted on Mar. 29, 2015, teaches that "Planting bee forages for honeybee nutrition can offer significant benefits to the industry". While it says that "Variety is the spice of bee life. Bees like options have (sic) at least four different species flowering at any given time throughout the year", it does not teach that one species may be planted primarily for honey and another as a nutrition supplement. Hughes lists numerous plant species suitable for attracting bees, giving brief notes about each. *Leptospermum* (Tea Tree) is mentioned at page 19, as a favourite flower of the bee species Thyreus sp., or Neon Cuckoo Bee. These bees do not need pollen, but visit a flower to feed on nectar, suggesting there is no need for nectar species to be interspersed with pollen producers in the same foraging cell.

Deutsch, University of Wisconsin-Extension, "The Honey Bee's Needs; Nectar and Pollen", pages 1-27, dated Mar. 29, 2016 teaches that bees need a balanced diet of pollen and nectar. It suggests providing a variety of plants that bloom throughout the summer, but does not suggest how these should be supplemented if at all.

Boffa Miskell Limited in "The Manuka & Kanuka Plantation Guide", pages 1-78; referenced pages 1, 21-24, 29, issued April 2017, deals exclusively with cultivation for manuka honey and oil. It identifies the challenge addressed in the present invention—see page 21, RH col., but it does not propose a solution. At page 23, it teaches that "[H]oney bees need ongoing sources of high quality nectar and pollen, so hives must have access to or be moved to other floral sources when mānuka and kānuka flowering ceases." If bees have limited floral resources available, "they will focus on the most attractive flowers, meaning that greater numbers of bees will visit the favoured flowers within the foraging area, potentially leading to hive malnutrition and disease." It mentions that there are website resources advocating planting tree species to provide year-round food resources for bees and other pollinators, teaching that alternative food resources need to be provided for the bees to tide them over non-flowering periods—not to provide nutrition during manuka flowering time.

Russian patent publication RU 2299560 discloses a domed structure for isolating a bee population from unfavourable climatic conditions.

For purposes of cross-pollination, U.S. Pat. No. 4,077,157 (Bradner) proposes growing plants of two different populations in pollinating proximity, such as soybean plants of different first and second populations grown in alternating strips. The proximity of the two populations must be adequate to permit cross-pollination through the agency of pollen-carrying insects, particularly the leaf cutter bee. The alternating strips may consist of one or more adjoining rows of the plants of each population. This disclosure does not deal with honey production and the challenges arising therein.

BRIEF DESCRIPTION

The present disclosure addresses the shortcomings of the prior art and, in doing so, provides a bioactive honey-producing environment containing honey-producing insects such as bees, and honey nectar-yielding plant species, together with nutrition supplementation for the insects concerned.

The present disclosure provides means for producing bioactive honey on an industrial scale.

The present disclosure further provides a cell for industrial scale bioactive honey production in which the plant populations present may be varied to increase the overall duration of flowering and overall production volume.

The environment may be considered artificial in the sense of including plants of a least one species that have been added to an existing environment that may be naturally occurring.

The term "hive" is used in this specification to refer to the nesting place of the bees or other insects producing bioactive honey according to this invention. It is not intended that the term be understood only to refer to a man-made construction, but to include structures naturally formed by such insects, whether completely in the wild or in a cell environment to be described further herein.

Similarly, although the invention is described primarily in relation to bees, the term "bee" should be interpreted to include related insects capable of producing honey.

The preceding discussion is intended to facilitate an understanding of the present disclosure. However, it should be appreciated that the discussion is not an acknowledgement or admission that any of the material referred to was part of the common general knowledge in Australia or elsewhere as at the priority date of the present application.

Further, and unless the context clearly requires otherwise, throughout the description and the claims, the words 'comprise', 'comprising', and the like are to be construed in an inclusive sense—that is meaning "including, but not being limited to"—as opposed to an exclusive or exhaustive sense—meaning "including this and nothing else".

The present disclosure is applicable in both external (open air) and internal (covered) environments. It has application to bees as well as other bioactive honey-producing insects.

According to a first aspect, there is provided an artificially-created honey-yielding environment including a hive and, associated therewith, a flora cell, within which first and second plant populations cohabit, one of which has been artificially introduced, and within which bees or other honey-producing insects from the hive are permitted to forage, the first population being selected as a primary source of a nectar from which a predetermined bioactive honey type is derivable, and the second being selected as a source of a nutrient not available from the first species at a nutritionally adequate level for sustaining said foraging bees (or said other insects) for returning to the hive.

According to the disclosure, the cell may include a structure defining a physical boundary to honey-producing insect flight.

The boundary may be defined by a mesh admitting air but preventing egress of honey-producing insects from the cell. The boundary may alternatively or in combination be defined by impervious panels. The panels may include transparent panels. The panels may be openable and closeable. When opened, the openings defined by the open panels may be covered by mesh.

In an embodiment, the cell includes a plurality of suspended plant containers. The containers may be suspended from the structure, or from a dedicated support frame housed within the structure.

In one embodiment, the cell structure covers terrain of an extent sufficient to define a physical boundary to honey-producing insect flight beyond it.

In a further embodiment, the first population includes a *Leptospermum* species.

The species may be selected from *Leptospermum polygalifolium, L. liversidgei, L. whitei, L. speciosum, L. petersoni, L. scoparium, L. riparium* and their subspecies and hybrids. In the case of *L. polygalifolium*, the subspecies are selected from one or more of *L.* p. ssp. *cismontanum, L.* p. ssp. *transmontanum* and *L.* p. ssp. *tropicana*.

In a yet further embodiment, the nutrient from the second population comprises protein.

In one embodiment, the second population includes the species *Corymbia maculata*.

The numerical ratio of the first population to the second population may be in a range selected according to the resident honey-producing insect species.

The numerical ratio of the first population to the second population is in a range selected for maximizing bioactivity of the honey sourced from said first population.

In one embodiment, the ratio for European Honey Bees is in the range from 10 to 6 of the first to the second population.

In a further embodiment, the second population is located substantially to surround the first population.

According to a second aspect, there is provided an artificially-created honey-yielding environment including:

a. a honey-producing insect foraging cell containing controlled flora comprising a first population of primary honey-source plants and a second population of plants selected as a source of a supplemental nutrient for augmenting nutrition of foraging honey-producing insects, wherein the honey-producing insects derive nectar for producing bioactive honey from the primary source and augment their nutrition for foraging from the nutrition-providing species, and b. a hive located within foraging distance of the cell and within which honey-producing insects of a species selected for collecting nectar from the first population are resident, wherein at least one of the populations has been artificially introduced to the cell to cohabit with the other population.

Control of the flora is by way of removing unwanted species from the cell. It may also be achieved by cultivating the introduced population in a viable quantity to grow in the cell.

The cell is a bounded zone within the environment within which the honey-producing insects are incentivised to forage by populating it with plants of the first population.

The zone may be maximized in territorial extent at least to correspond to the range of foraging of the honey-producing insects.

In one embodiment, the first population includes plants selected for sourcing of bioactive honey.

The first population in one embodiment includes plants of the family *Leptospermum*. Further, the first population may include *Leptospermum polygalifolium* and subspecies thereof, for example *L. p ssp cismontanum*. Further, the *Leptospermum polygalifolium* subspecies may be selected from one or more of *L. p. ssp. montanum, L. p. ssp. cismontanum L. p. ssp. transmontanum* and *L. p. ssp. tropicana*. Alternatively, or in addition, the species may be selected from *Leptospermum liversidgei, L. riparium, L. whitei, L. speciosum, L. petersoni, L. scoparium* and their subspecies and hybrids.

The second population may include a species selected for maximising honey-producing insect nutrition efficiency. The nutrient from the second population may include a protein. A suitable example of a protein source is *Corymbia maculata*.

The ratio of the first to the second population is determined according to its capacity to enhance honey bioactivity to weight of honey produced. One of the main parameters for measuring bioactivity in honey is the level of methylglyoxal (MGO), reported in ppm, present in the product.

Further, the populations may be grown in a substrate of acidic soil.

The disclosure, in a third aspect, provides an artificially-created honey-producing cell having a layout including first and second plant populations grown in a ratio of individual numbers or of biomass wherein the ratio is selected according to a known foraging range of honey-producing insects selected for release into the cell from a hive therein, for nectar collecting and wherein the first population is selected as a primary source of nectar for producing a bioactive honey and the second population is selected for its capacity to supplement nutrition of the foraging honey-producing insects for enabling them to return to said hive. The honey-producing insects are thus enabled by virtue of the supplemented nutrition maintaining metabolism and promoting tissue repair.

In one embodiment, the second population is selected to make up for a deficiency in protein in the nectar of the first population.

In one embodiment, the first population includes a species of *Leptospermum*. The second population may include a species suitable as a source of protein for honey-producing insects.

In a further embodiment, individuals of the second population are located at a distance from the hive that corresponds to a known maximum foraging range of the honey-producing insects.

According to a fourth aspect, a method of honey-farming includes the steps of c. creating
   i. a flora cell populated with a first population of honey-producing plants and a second population of honey-producing insect nutrition-providing plants and
   ii. a hive associated with said cell,
d. allowing honey-producing insects from the hive to forage in the first population for bioactive honey-producing nectar and in the second population for nutrition to see them back the hive without significant depletion of the nectar gathered from the first population, The method may extend to the step of collecting bioactive honey from the hive.

In one embodiment, the method includes arranging plants from the respective populations in an array defining a matrix of said populations interspersed.

The first population may include a *Leptospermum* species. The species may be selected from *L. polygalifolium, L. speciosum, L. whitei, L. liversidgei, L. scoparium, L. riparium* and combinations thereof. The population may include a subspecies of the species above, by way of example *L. p. ssp. montanum, L. p. ssp. cismontanum* and *L. p. ssp. transmontanum* and *L. p ssp tropicana*. These may be cultivated in the cell in rows alternating with rows of a nutrient source species.

In one embodiment, the method includes locating the hive within the cell.

The hive location may be selected considering honey-producing insect health and foraging radius. Further, the method may include optimising honey-producing insect health at the expense of foraging radius.

In one embodiment, the method includes the step of maximizing cell radius in respect of hive location, whereby the maximized radius corresponds to known foraging range from the hive location of the honey-producing insects of the cell.

According to a still further, there is provided a method of maximizing the foraging range of bioactive honey-producing insects from a hive, the method including the steps of establishing an environment comprising a first population of plants yielding nectar from which bioactive honey is producible and a second population of plants yielding pollen having nutritional properties for the honey-producing insects, and allowing the honey-producing insects to forage in said environment.

In one embodiment, a majority of members of the first population are located between the hive and the second population.

In one embodiment, the majority constitutes at least 80% of the first population by number.

In a further embodiment, the method includes establishing the honey-yielding environment as a controllable environment. This may be achieved by enclosing said environment under covering means. The covering means may include a dome structure adapted for opening and closing for controlling the passage of honey-producing insects therethrough.

The second population may define a nutrient belt between the controllable environment and the wider environment at large.

BRIEF DESCRIPTION OF THE DRAWINGS

In order that the disclosure may be readily understood, and put into practical effect, reference will now be made to the accompanying figures. Thus.

Figure 1:
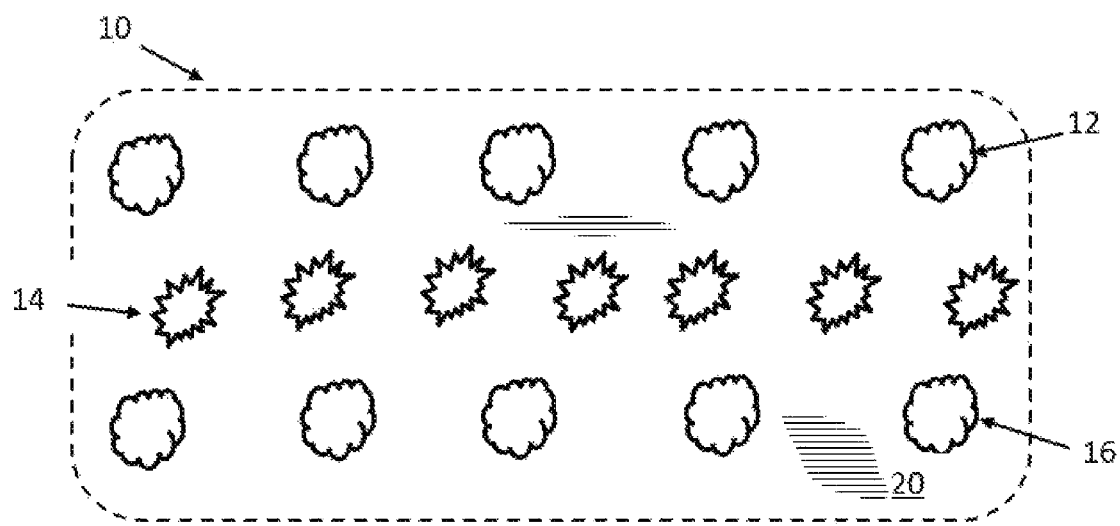
FIG. 1 shows in schematic form an overhead diagram of one embodiment of a honey-producing environment.

Within the drawings the letters H, L and N appear numerous times. These are explained in the narrative that follows. Generally, unless the context clearly indicates otherwise, these should be interpreted as follows: H means "hive" of a complex of hives; L denotes to a *Leptospermum* species and N a nutrient plant source.

DETAILED DESCRIPTION

In this disclosure, production of bioactive honey on an industrial scale is envisaged by providing a structured honey-yielding environment conducive to honey-producing insect nutrition and health. The structured environment may be created as a foraging cell or group of cells inhabited not only by bees or other honey-producing insects, but also by a controlled population of flora. The embodiments described below refer for convenience to bees. However, it will be appreciated that the concepts of the disclosure have application to the production of bioactive honey derived using other insect species too.

The controlled flora present in the bee foraging cell includes a first population of primary bioactive honey-source plants and a second population of nutrition-providing plants suitable for nourishing foraging bees, so that the bees do not deplete the overall benefit of nectar they have collected, in finding the energy to return to their hive. The honey produced by the bees visiting the first population is bioactive, by virtue of the species of the population. Both populations may provide a source of nectar from which honey is derived by the bees. However, the second population is selected for its nutritional capabilities in regard to the bees.

Control of the flora within the cell is by way of introducing individual plants of one or more desired species and subspecies to grow in the cell and by removing unwanted species from it.

The foraging area or zone within the apiculture environment, from which the bees collect nectar before returning to their hive. is referred to as a cell. This disclosure provides for a cell that is optimizable for meeting honey production targets for different bee species and primary honey source plants. The cell design may provide for the inclusion of one or more nutrient species selected to not out-compete the primary honey source population, for example *Leptospermum*. Without wishing to be bound by theory, such a design choice may be at the cost of bioactive honey volume, perhaps because the honey source is positioned further from the hive than the nutrition replenishment population.

Variables that contribute to the successful production of bioactive honey include, without limitation, the nectar-yielding plant species providing the honey source, the honey-producing insect species employed and the plant population that provides additional nutrition for the bees when foraging in a cell in which the primary nectar-yielding plant species proliferates. Plant proliferation depends on further variables such as growth medium, sunlight, nutrition and water. The disclosure combines these variables in a controllable environment to maximise or optimise bioactive honey production on a sustainable basis. In the context of the disclosure, sustainability applies to the maintenance of the hive by way of the selection of plants populating the cell assisting in providing nutrition to see the bees return from foraging, without consuming the nectar that would otherwise be used for production of the bioactive honey.

In the disclosure, the first plant population provides the nectar for production of the required functional honey. The population for producing a bioactive honey may, for example, comprise a *Leptospermum* species. The species may be selected from *L. polygalifolium, L. speciosum, L. whitei, L. petersoni, L. liversidgei, L. scoparium, L. riparium* and combinations thereof. The population may include a subspecies of the species above, by way of example *L. p.* ssp. *tropicana, L. p.* ssp. *montanum, L. p.* ssp. *cismontanum* and *L. p.* ssp. *transmontanum*. It may also include a *Leptospermum* hybrid such as *L. polygalifolium* ssp. *cismontanum*X *L. whitei*. Non-limiting examples of other plant species suitable for the first population include the following *Eucalyptus* members: *E. diversicolor* (karri tree, native to southwestern parts of Western Australai), *E. gomphocephala, E. haematoxylon, E. marginata* (Jarraj tree of Western Australia), *E. patens, E. calophylla* (known as the Marri tree in Western Australia). These *Eucalyptus* species are known for producing nectar from which bioactive honey having superior antimicrobial properties is produced.

The first population may be cultivated with the plants in rows of a selected subspecies alternating with rows of a nutrient source species. In an alternative arrangement, the first population may be cultivated within a first zone surrounding the hive and the second population may be occupy a zone along the outer periphery of the first population zone, generally in concentric circles.

The second, nutrient-supplying population may include a species of heather. Other examples of nutrient species suitable for providing nutrition to bees foraging in a primarily *Leptospermum* plantation include (without limitation) *Corymbia maculata*, *Vita fabia*, ericacea and the like. Further examples include the groundcover species Lupines, Cowpea, the Fava Bean, Alfalfa, and varieties of clover; shrubs such as Autumn Olive, Azaleas, Rhododendrons, Fothergillas, Holly, Gardenias, *Pachysandra*, the Japanese Iris, Ttrillium, *Begonia, Caladium, Dogwood, Magnolia* and Hydrangia; and among tall trees, the Empress Tree.

It has been found that the ratio of the number of plants in a bee forage plantation of *L. polygalifolium* to the number of nutritive plants may be in the range from 0.70 to 1.25, preferably 0.92 to 1.05 and ideally 1:1.

The ratio of bioactive to nutritional plant biomass may be monitored by a horticulturalist or apiarist and modified to maximize honey bioactivity, as expressed in the MGO number, or the bioactive honey volume.

Maximum bioactivity is able to be predicted by applying the following proportionality relationship:

$$\text{Maximum bioactivity per volume} = \text{function of } [(R \cdot P_n / N_n) \cdot F_n]$$

where
R=Radius of cell
$P_n$=number of bioactive species in the cell population
$N_n$=number of nutrition species in the cell population, and
$F_n$=number of bee hives The value of R, the bee foraging range, defines the maximum radius of the cell in which the bees are permitted to forage. It is found that for a high yield honey producing bee species, the plants yielding the relevant nectar need to be kept within that radius of the hive. Consequently, the hive may be centrally located within the foraging cell.

A hive would have one queen bee and between 20,000 and 80,000 foraging bees. A *Leptospermum* plant typically has about 1000 flowers. Each bee can visit as many as 18,000 flowers per day. A bee may have a range of 4 km, but may operate within a 2 km radius of the hive.

The *Leptospermum* matrix composition may be determined by an apiarist or horticulturalist, or both working together, to maximise honey bioactivity. The outcome is found to depend on the nature of the substrate soil, the plantations and climatic factors.

Alternatively, or in addition to locating the bees for the size of the forage environment, the apiarist may limit the bee hive population to bees having a foraging range within predetermined parameters. The maximum foraging range corresponds to the radius of the cell in relation to the location of the hive therein. This may necessitate removal from the hive of bees having a shorter than desired range and others having excessive range. However, this may be achieved by way of a selective breeding campaign. In the case of the bees of excessive foraging radius, there is a risk of their range taking them beyond the point from which they are unable to return to the hive. In the case of both low and excessive range, removal of these bees and replacing them with individuals of the desired foraging range can improve efficiencies of production and nutrition. Of course, it will be appreciated that a completely identical foraging range for each bee in a hive is not practically attainable. There will remain a variance in the range of individual bees and in their day to day roving, dependent on feeding conditions, opportunities and daily weather.

In one embodiment, the growth medium for the plant populations may be an acidic soil. The nutrient population may be an acidic soil species introduced into a plantation of *Leptospermum polygalifolium* already being cultivated in acidic soil.

To minimise seasonal effects on industrial scale production, an extension of the honey flow availability is required. This is achieved by providing the cell as a matrix of plants with staggered and partially overlapping flowering times. Each bioactive and nutritional plant species has a bell curve (Gaussian) distribution of its flowering times. Staggered flowering times of both bioactive and nutrient plants lengthens the duration of honey flow. Honey production volume can be maintained, optimised and maximised when the matrix composition is determined by taking into account volume yields and bioactivity in the species available for inclusion and cultivation.

Referring to FIG. 1, an example of a growth matrix for use in the disclosure is shown. Here a nectar foraging cell 10, having an acidic soil substrate 20, has planted in it first and second rows 12, 16 of spaced apart *Leptospermum* species individuals and, between them, a row of a nutrient-yielding species, in spaced, staggered formation. The nutrient-yielding species is *Corymbia maculata*, otherwise known as the spotted gum and, previously, *Eucalyptus maculatus*. The pollen of this species has a crude protein content in the range 25% to 31% by weight. Although it has an adequate yield of honey-producing nectar in its own right, honey produced from the spotted gum is not considered bioactive. Other species presenting similarly elevated crude protein yields in their pollen are to be found in the table at the website, incorporated herein by reference:
https://www.honeybee.com.au/Library/pollen/sname.html High protein yielding species from the list may be cultivated alongside species selected for their bioactive honey yielding nectar in implementing the present invention. Examples are those that thrive in acidic soil.

Figure 2:
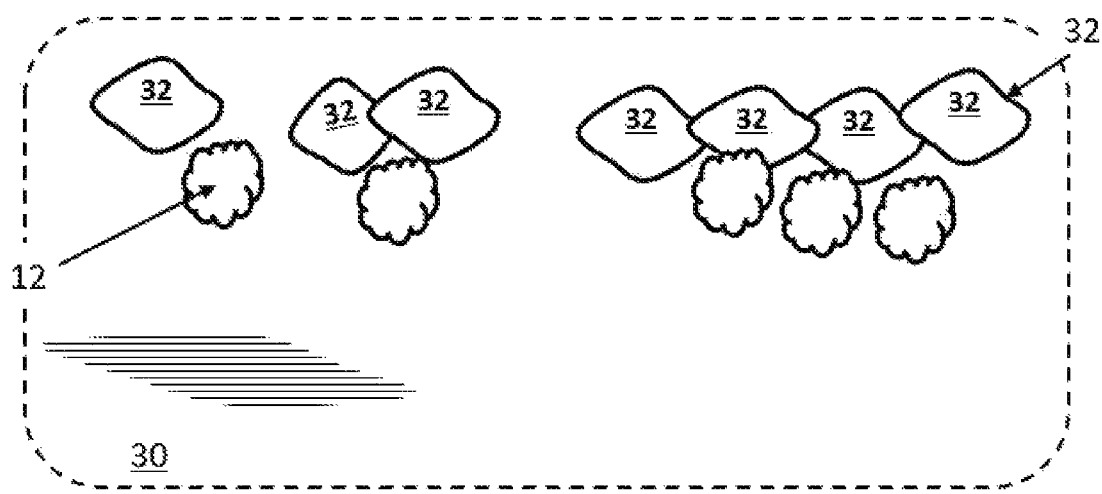
FIG. 2 is a schematic overhead diagram of a second embodiment of a honey-producing environment.

In FIG. 2, there is shown a portion of a foraging cell 30, which is made up of a heather site in which there are individual heather plants 32 in a random spatial distribution. Alongside the heather are planted *Leptospermum* individuals in locations selected to increase their concentration according to the number of proximate heather species, to maintain a predetermined minimum nutrition-sourcing ratio. The heather site is transformed into a cell for the production of functional honey.

Figure 3:
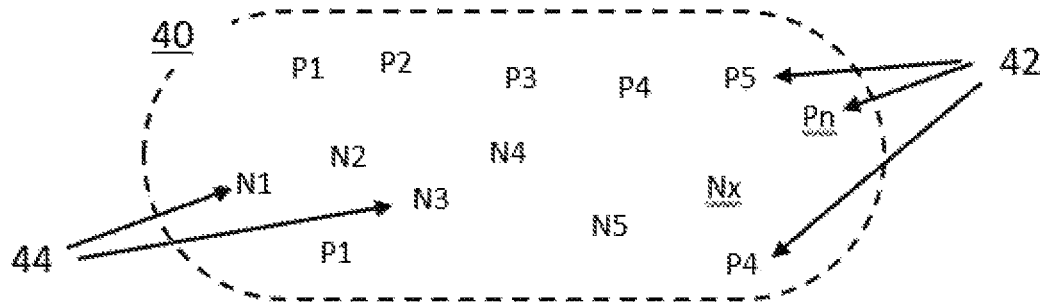
FIG. 3 is a diagram of a honey-yielding cell within which are located primary honey source plants of different species and nutrition-providing plants of different selected species.

In FIG. 3, a cell 40 is schematically set out in a further non-limiting example of an embodiment of the invention. It comprises a grid of various *L. polygalifolium* subspecies 42, numbered P1, P2 to Pn, and various nutrient species 44, marked N1, N2, N3 etc., to Nx.

Figure 4:
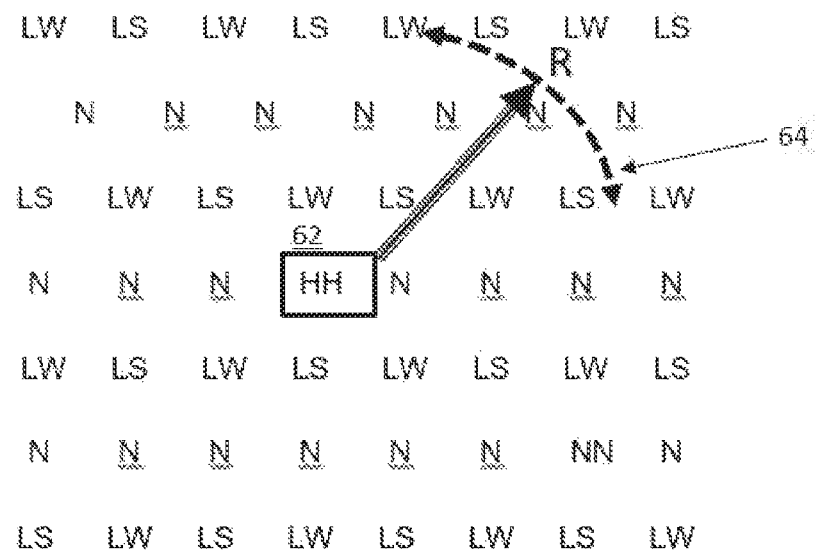
FIG. 4 illustrates in a schematic diagram an overview of a plantation of at least two different primary honey source species in combination with nutrition-providing plant species and the foraging range of a bee species selected to forage in the cell defined by the plantation.

The diagram in FIG. 4 represents an embodiment in which a group of hives HH 62 is placed in a cell for honey production, the cell being defined by the radius of foraging of the bees resident in the hives. The radius is represented by radial arrow R which defines a circumference of the cell, part of which is depicted by broken line 64. The cell is populated by nutrition trees N and two different species of bioactive honey-producing tea trees, for example *L. whitei* (LW) and *L. speciousum* (LS). The soil is acidic in nature. Australian, as well as Global and Pacific Island podsols are suitable examples for use in the cell.

The cell of FIG. 4 can be considered as an external environment having a soil layer which provides a growth medium for a ground layer, a shrub layer and a canopy layer to provide a bioactive honey permaculture. By way of example, the ground layer may comprise *Vicia faba* (also known as Broad Bean) and ericacea.

The shrub layer may advantageously be made up of a matrix of *L. polygalifolium* and *L. riparium* as an understory species, to provide the primary source of bioactive honey. The tree canopy may be *Corymbia maculata* (the 'spotted gum'), to provide isoleucine, an essential amino acid pollen, for augmenting the bioactivity in the honey to be produced.

Figure 5:
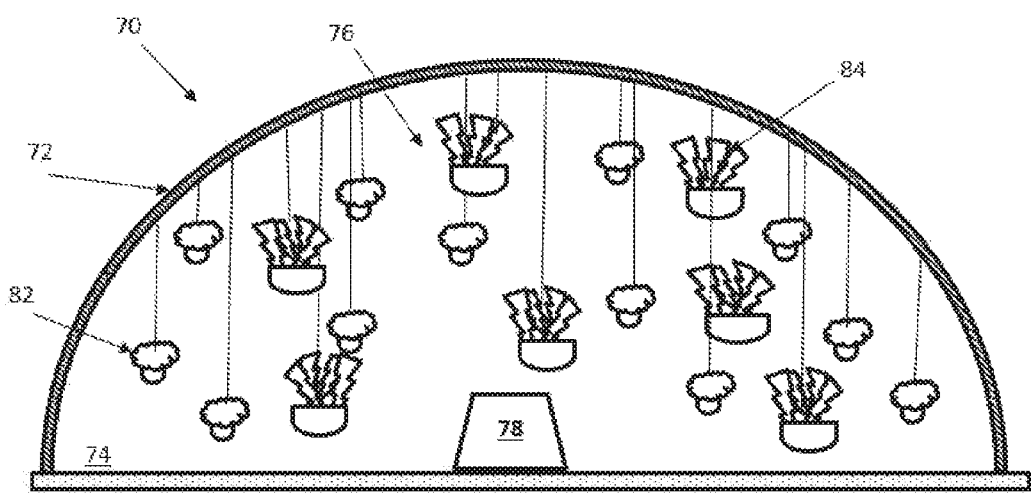
FIG. 5 depicts schematically in cross-section a concept apiculture cell for implementing the embodiment of FIG. 1.

FIG. 5 illustrates in cross-section an enclosed apiculture environment 70 defined by a domed structure 72 and a base 74 on which it is anchored. The domed structure comprises a framework covered by netting. The netting may be a barrier of mesh, sized to isolate the interior 76 against ingress of bee predators and to keep bees from a hive 78 within the dome confines, while allowing air and moisture to circulate. In another embodiment, the dome is a glass paned structure admitting light while enabling air-conditioning (not shown) to regulate the interior to simulate predetermined, desired apicultural conditions. In a further embodiment, the panels are openable and closeable by remotely controlled servo-motors, to allow control of the interior conditions without necessarily using air-conditioning. The dome described here is but an example of a horticultural architectural structure that may be adapted for this disclosure.

Within the dome, interspersed populations of selected respective nectar source plants 82 and bee nutrition-augmenting plants 84 in predetermined ratios are cultivated in suspended soil-filled containers, such as plant pots or baskets, suspended by cables from the dome structure 72. In large domes, housing large pluralities of plants and multiple hives, additional supports are provided independently of the dome to provide suspension points for plants. Aerial walkways are included for personnel to have access to individual plants. In other embodiments, the plants are raisable and lowerable on their cables by mechanisms well known in the arts of industrial lifting and suspension.

The cell defined by the dome may be adjusted not only in terms of atmospheric conditions, but also regarding the species of plants provided for foraging by the bees and by removing and introducing different species of bees. The adjustments may be implemented according to the changes in the seasons.

Figure 6:
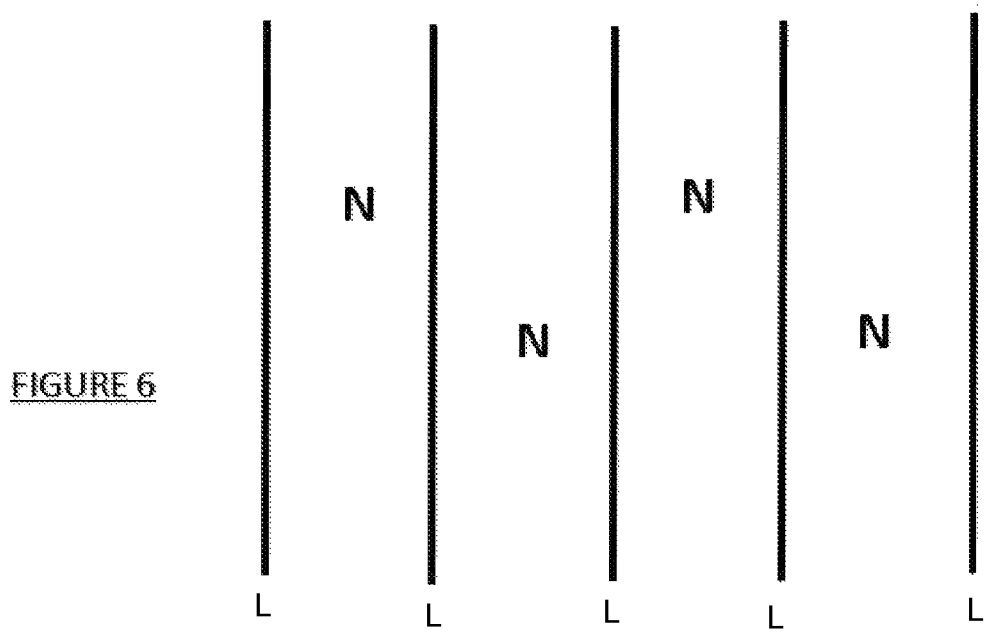
FIG. 6 illustrates an embodiment in which different subspecies of *L. polygalifolium* are set out in separate rows with a row of nutrition source plants separating each adjacent pair of the rows of subspecies.

In FIG. 6, rows of different species and subspecies of *Leptospermum* are depicted by the dark vertical lines. In between these lines are individual plants or clumps of biomass comprising protein-yielding nutrition for European bees foraging for honey-producing nectar in the *Leptospermum*. Further rows may be added to increase the cell extent defined thereby, subject to the foraging range of the selected bee species from the location of the hive (not shown).

Figure 7:
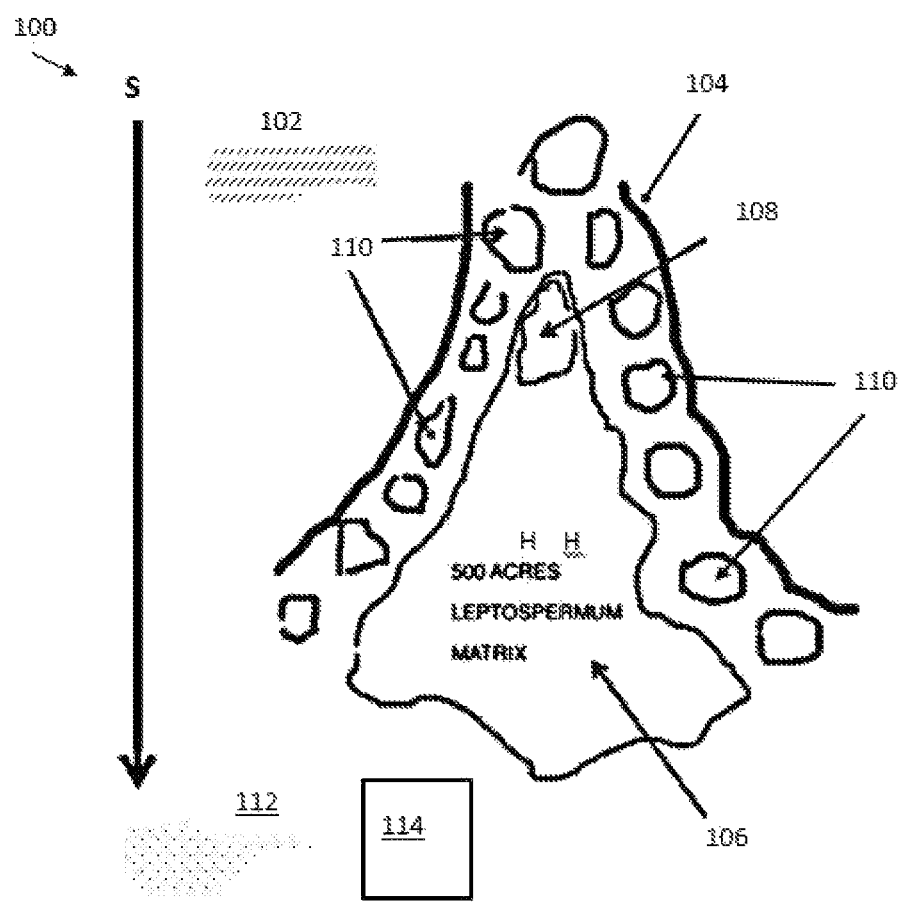
FIG. 7 is a schematic layout of an outdoor environment for apiculture.

With reference to FIG. 7, there is shown the schematic layout of an outdoor apiculture system 100 that has been established on a highlands tableland 102 according to the invention. The land slopes downwardly from the top of the page, as indicated by directional arrow S. On a north-facing slope (the sunny slope in the Southern Hemisphere) is an ecocline of acidic soil 104. The system is dominated by a sizeable 500-acre population of *Leptospermum* matrix 106, comprised in this example of *L. polygalifolium*, *L. whitei* and *L. speciosum*. At the uppermost portion of matrix 106 is a population 108 of the subspecies *L. polygalifolium* ssp. *montanum*. The matrix area is surrounded by cultivated smaller woodland populations of the nutrition source *Corymbia maculata* 110. The lowlands 112 are used for cultivating selected nutrient species in groves such as denoted by the numeral 114. Hives are located generally centrally, as denoted by the letters H. The peripheral siting of the *Corymbia maculata* individuals 110 and the lowland grove 114, containing a cultivated nutrition-yielding population, is found to induce the bees to fly through the *Leptospermum* matrix that immediately surrounds the hives in their quest to reach the flowers they prefer. On the way, however, they gather *Leptospermum* nectar. Once they have replenished their protein from the peripheral nutrient species, they make their way back to the hive, gathering more nectar instead of consuming it.

Figure 8:
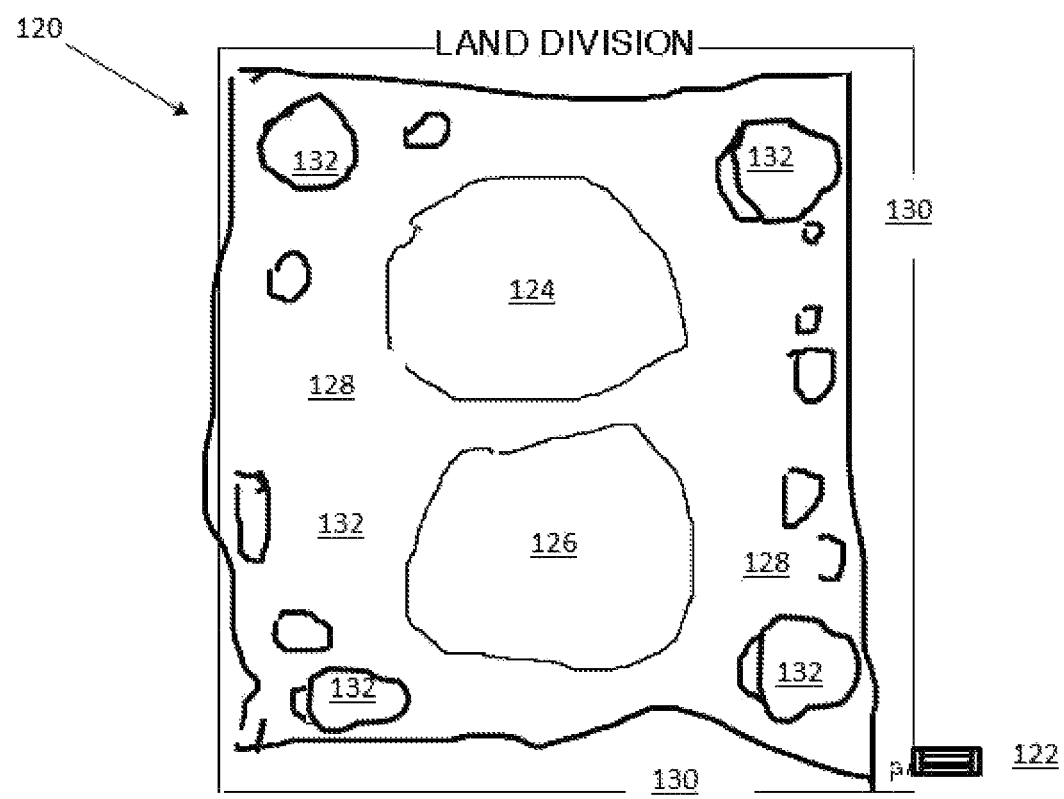
FIG. 8 illustrates in schematic plan view a further example of an open-air honey-yielding environment, this time located in a fenced land division.

FIG. 8 shows in schematic plan view a further example of an apiculture environment, this time located in a fenced land division 120 having a gated entrance 122 and spaced populations 124, 126 of *L. polygalifolium* trees cultivated within a surrounding population of a nutrient species 128. The ground external to the area populated by nutrient species 128 is populated predominantly by a different nutrient species 130. Small copses and individuals of *Corymbia maculata* 132 are dispersed to surround the bioactive *Leptospermum* species populations, within designated land division 120. A bee hive (not shown) is located generally at the centre of the cell, as in previous embodiments described.

Figure 9:
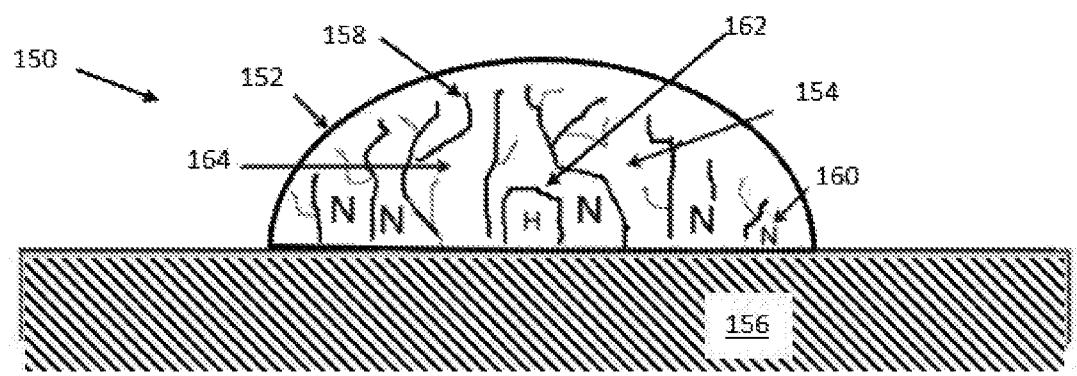
FIG. 9 is a schematic cross-sectional view of a sheltered apiculture environment in an arched tunnel structure.

FIG. 9 illustrates in cross-sectional end view an industrial scale bioactive honey-producing apicultural environment 150, enclosed within a horticultural enclosure defined by an arched roof 152, providing an internal space 154 within with a general elongated tunnel-like shape. The structure is erected on an acidic soil substrate 156 in which a population of *leptospermum* species 158 are cultivated, interspersed with a nutrient species 160 (also designated by the letter 'N'), and surrounding a hive 162, which is resident to a population of European bees. *C. maculata* pollen 164 is dispersed artificially within environment 154. The open ended nature of the *Leptospermum* cell defined by the structure is found to be suitable for sugar and protein augmentation to encourage selective production of the desired *Leptospermum* honey. An example of the implementation of a method of setting up a honey-producing environment is set out below.

Figure 10:
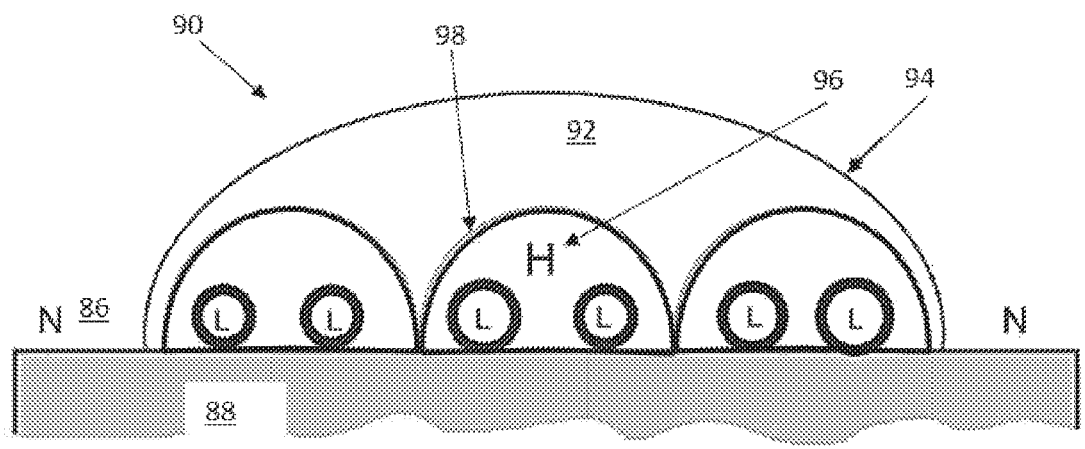
FIG. 10 is a schematic sectional view of a cell having an external and an internal zone structure, according to another embodiment.

FIG. 10 is a schematic sectional view of an industrial scale bioactive honey-production cell 90 constructed on a bed of acidic soil 88. The cell includes an controllable internal environment 92 enveloped in a dome structure 94, erected in a larger plantation 86 of nutrient yielding trees such as *C. maculata*, signified by the letters N. The plantation constitutes an external environment that is attractive to bees.

The dome allows conditions within to be controlled for healthy growth of the plants within and the bees that venture into it from hive 96. The plants are bioactive honey nectar-yielding *Leptospermum* trees, signified by the encircled letters L. Through arch-like openings 98 in the dome wall, bees are able to come and go, passing from the controlled internal 92 to the relatively uncontrolled external environment 86. As the bees are attracted to venture into external environment 86, they pass through the internal matrix of the bioactive honey-nectar-yielding trees, almost inevitably gathering at least some of the nectar available. The overall energy of the bees is thought to be maintained sufficiently from their being able to visit both environments while foraging, before returning to the hive, having preserved their loads of relatively protein-poor *Leptospermum* nectar, while utilising the relatively protein-rich pollen from the nutrient-yielding species in the external plantation as their principal energy source.

Figure 11:
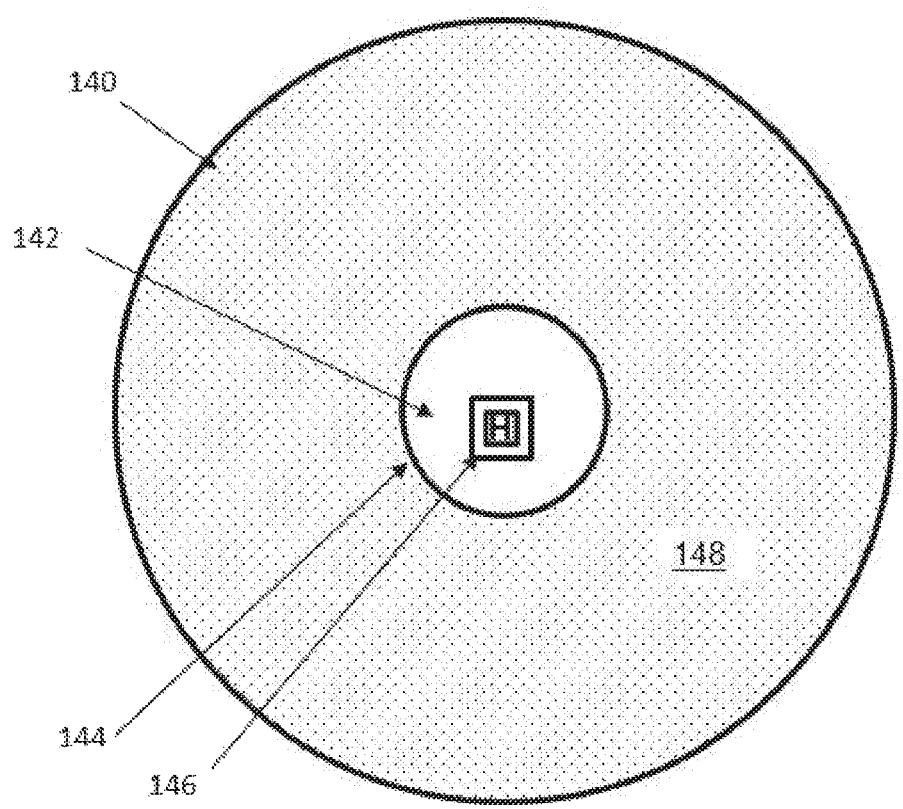
FIG. 11 depicts in plan view a honey production cell having a central dome and a surrounding foraging zone.

In FIG. 11, an industrial scale bioactive honey production facility that extends over a 50 ha zone 140 is illustrated schematically in plan view. A central portion 142 of the zone is under cover of an elliptically shaped dome 144, having a terrestrial radius of 25 m and a maximum internal height of 32 m. The dome defines a controlled area within which are cultivated a first population of *L. polygalifolium* and a second population of *C. maculata* in a numerical ratio of 1.03. A hive 146, housing about 50'000 European honey bees, is placed centrally at ground level in the dome. The dome is equipped with movable side panels of known design. During winter months or times of extreme summer weather, the panels are held in closed position, not allowing the bees to exit the dome. When the panels are moved to open position, the bees emerge to forage in the wider external matrix area 148, which stretches radially for a distance of 375 m around the dome. The plant populations external to the controlled, dome environment comprise the same species, but in a lower ratio of 0.72 *L. polygalifolium*: *C. maculata* than inside the dome. This surrounding zone represents a flora transition zone between the central dome-enclosed zone and the unmanaged environment existing beyond facility 140. The transition zone provides a zone in which the bees are incentivised by the presence of the nutrition-rich *C. maculata* population of the external matrix to do their foraging and not venture excessively far from the hive.

Cultivating a relatively high proportion of bee-attracting nutrient species at a ratio that outnumbers the bioactive honey-producing species, helps to retain the bees in the production zone. Beyond the zone, steps may be taken to reduce the prevalence, if high, of alternative nutrient sources.

Figure 12:
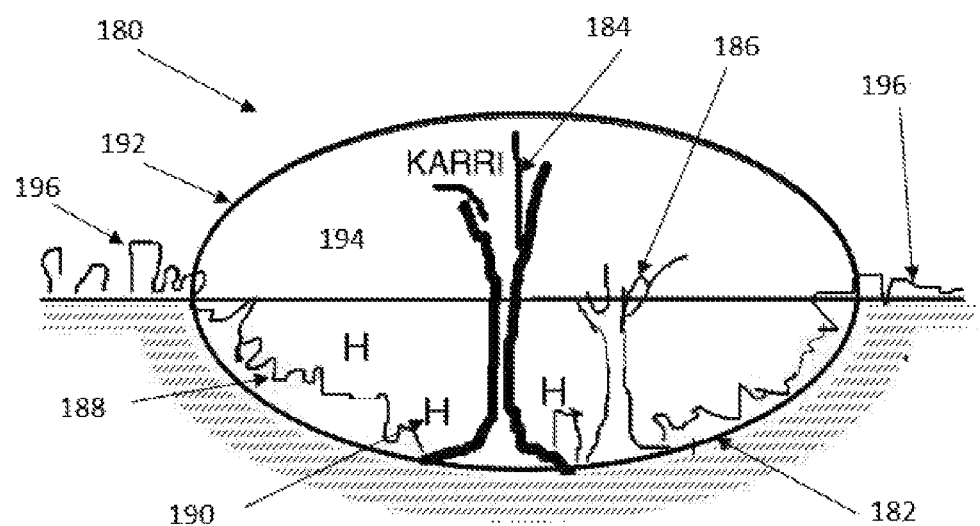
FIG. 12 depicts in sectional side view a honey production cell established in a natural ground depression.

A further embodiment of a cell 180 is illustrated in FIG. 12. Here, in a depression in the ground having the form of a natural basin 182 (it could, however, be man-made in other embodiments), grow a mixture of *Eucalyptus* species including Karri 184 and Spotted Gum (*Eucalyptus maculata*) 186. Below the canopy defined by the aforesaid tall trees grows a matrix of *Leptospermum* subspecies 188. Hives 190, denoted by the letter H are distributed within the basin. A domed cover 192 is erected over the basin to provide a controllable environment 194. The cover extends generally around the rim of the basin. Externally surrounding the basin and domed cover is a plantation 196 of nutrient species comprising heather. Bees are able to rove within the enclosed basin, remaining close to the hives when the dome is closed. However, when the dome is open, the bees are free to roam beyond, into the nutrient plantation and gather nectar further afield, where they are likely to encounter more sources of nectar that can be converted into bioactive honey.

The provision of the nutrient belt about the dome serves to extend the foraging range of the bees so that for the prevailing ratio of bioactive honey nectar-producing plants to ancillary nutrient species, the bioactivity of the honey produced can be maximised. The basin shape in which the tall trees grow assists as a catchment for rainwater runoff and the means for controlling the environment assists in maximising the flowering seasons and their frequency.

Further embodiments of the disclosure and the way in which it is implemented are presented in the examples that follow.

Example 1

The disclosure is applied in a horticultural application, in which a hectare of apple trees is interspersed with a matrix of *Leptospermum* trees cultivated in an acidic soil substrate. Since one hive holding 20,000 individual bees is adequate to extract pollen from 0.25 ha of fruit trees, such as apple and pear, four hives are located at the centre of the plantation. The required radius of foraging is 70 m, to cover the hectare.

Example 2

Figure 13:
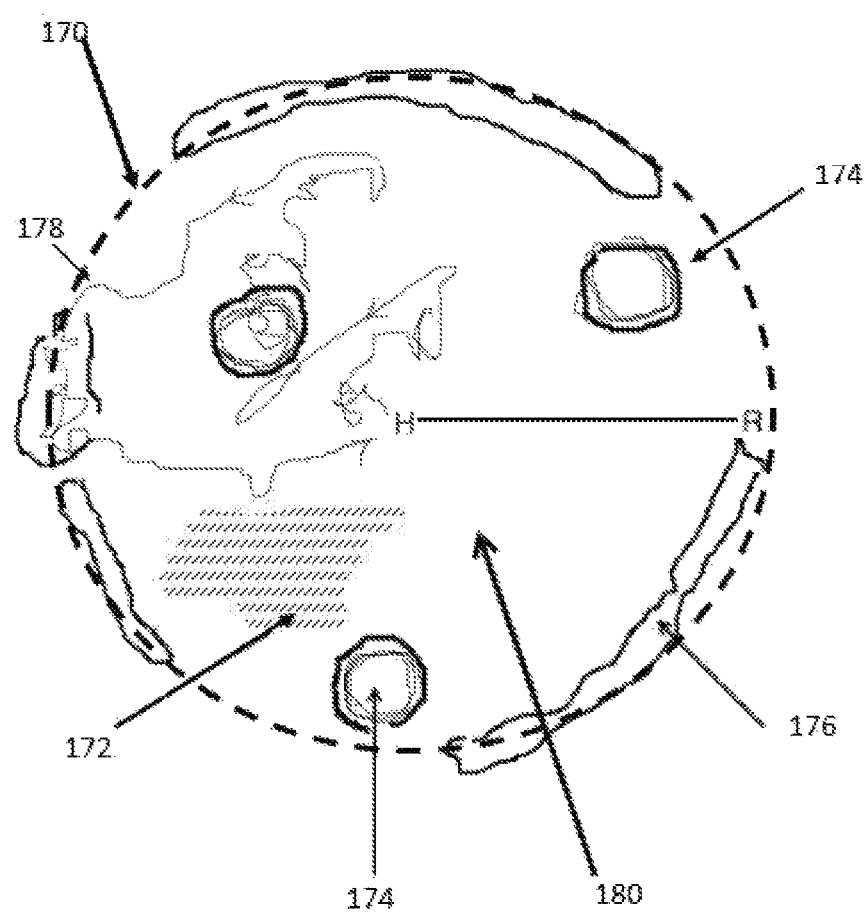
FIG. 13 depicts in plan view a honey production cell described in Example 2.

An example of a *Leptospermum* cell according to the disclosure is laid out as illustrated in the diagram of FIG. 13. The cell 170, shown generally by the broken circumferential line, has a maximised radius R from the location of a central hive complex H. The radius R is 2000 m and hive complex H houses between 20,000 and 80,000 bees of the species *Apis mellifera*.

The area within the circle radius R is predominantly populated by mixed matrices 172 of *Leptospermum* species and subspecies. These matrices are interrupted by occasional groves of *Corymbia maculata, Eucalyptus diversicolor* and the like 174. Located along peripheral portions of the cell circumference are populations of nutrient species 176. Resident bees from hive H forage randomly within the cell, as suggested by erratic lines representing the Levy flight pathway 178 of a selected bee. To assist with bee nourishment in foraging, the cell is supplemented with introduced protein and sugar.

The bioactivity of the honey produced is measured. Nutrient augmentation levels are adjusted at intervals until an optimum honey product volume and quality is obtained. Levels are adjusted to maximise output or to achieve a desired quality.

By applying the relationship described above, the maximum bioactivity per volume=function of $[(R \cdot Pn/Nn) \cdot Fn]$, a yield prediction is determined and compared with the actual value determined. This is applicable to all bee foraging environments, whether external, internal or hybrids thereof. In this example, the actual MGO value determined was +445 against a prediction of +470.

Example 3

A hive of European bees numbering some 3500 insects is provided and located within a cell defined by a plantation of established tea trees of the species *L. polygalifolium*. The tea trees are planted in spaced rows extending on all sides of the hive. Interspersed between the rows are heather plants of the Ericaceae family so that the biomass ratio of the tea trees to the heather is a managed variable. The managed ratio is maintained on a unit basis of 10 m² throughout the cell, which extends around the hive to a distance of 2000 m in each direction. This distance of 2000 m corresponds to the ideal foraging range of European bees.

The bees are supplied with fresh water in receptacles at numerous points in the cell and are allowed to roam as they please, foraging as per a Levy flight path, and leaving and returning to the hive without human intervention.

Example 4

A honey production cell is established under a ventilated dome. It comprises a 25% planting of heather, a 25% planting of *Corymbia maculata* and 50% *Leptospermum*.

Bees are released from a hive centrally located in the plantation. An apiarist applies a dietary formula established according to the geophysical parameters of the cell environment, which ensures the bees are provided a year round dietary supplement of 60% crude protein obtained from Lucerne (also known as alfalfa).

In this example, an industrial scale bioactive honey production facility was set up to extend over 50 ha. Nutrient species are beyond the controlled internal zone.

It is seen that by varying the ratio of primary to nutrient species and numbers of bees and their species, the outcome can be managed to produce quantity or quality and maintain or increase insect numbers. The quality in this instance is expressed in terms of the maximum bioactivity obtainable per unit volume of honey.

Example 5

Figure 14:
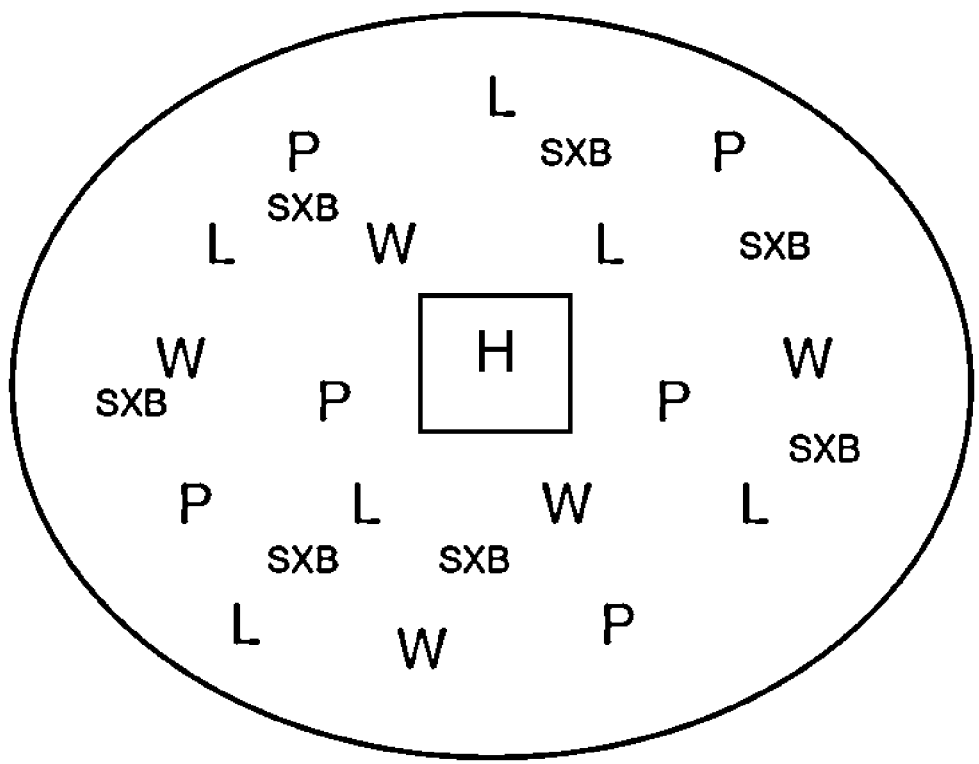
FIG. 14 is a schematic diagram of a temporal cell having a population matrix selected for extending the duration of the honey producing season.

A further example showing how the disclosure is applied to maximise the duration of honey production is illustrated with the temporal variant matrix in FIG. 14. The first, bioactive honey-yielding population comprises *Leptospermum liversidgei*, which generally flowers in Australia in the months January to March, *L. polygalifolium*, which flowers August to October and *L. whitei*, which flowers from October to December. The selection of these three species provides a potential flowering season from August to March. To extend the season to include at least some of the winter months, the sub-species *L. scoparium*× *barneyense* is added to the matrix in the cell. This plant has a flowering season from June to October.

These embodiments merely illustrate specific examples of the controlled honey-yielding environment of the disclosure and its implementation. With the insight gained from this disclosure, the person skilled in the art is well placed to discern further embodiments by means of which to put the disclosure into practice. The disclosure utilising a combination of a bioactive honey-nectar-yielding plant in a cell with a nutrient source plant suitable for extending the foraging range for a honey-producing insect may readily be applied to the industrial scale pharmaceutical production of bioactive honey and ancillary products and derivatives thereof from all known honey-producing insects.

The claims defining the invention are:

1. An artificially-created honey-yielding environment comprising:
    a hive and, associated therewith,
    a flora cell, within which first and second plant populations cohabit, one of which has been artificially introduced, and within which honey-producing insects from the hive are permitted to forage;
        the first population being selected as a primary source of a nectar from which a bioactive honey type is derivable; and
        the second population being selected as a source of a nutrient not available from the first population at a nutritionally adequate level for sustaining said foraging honey-producing insects for returning to the hive, the second population comprising individuals located remote from the hive at distances selected for extending foraging range of the insects from the hive.

2. The environment of claim 1, wherein the cell comprises a structure defining a physical boundary to honey-producing insect flight.

3. The environment of claim 2, wherein the cell structure covers terrain of an extent sufficient to define a physical boundary to honey-producing insect flight beyond it.

4. The environment of claim 1, wherein said first population comprises a *Leptospermum* species selected from at least one of *Leptospermum polygalifolium, L. liversidgei, L. whitei, L. speciosum, L. petersoni, L. scoparium, L. riparium* and their subspecies and hybrids and wherein the nutrient from the second population comprises protein.

5. The environment of claim 1, wherein the first population and the second population are present in a numerical ratio in a range selected according to either or both of the following: (a) the honey-producing insects; and (b) for maximizing bioactivity of the honey sourced from said first population.

6. The environment of claim 1, wherein the second population is located substantially to surround the first population.

7. An artificially-created honey-yielding environment comprising:
    a. a honey-producing insect foraging cell containing controlled flora comprising a first population of primary honey-source plants and a second population of plants selected as a source of a supplemental nutrient, augmenting nutrition for foraging honey-producing insects, wherein the honey-producing insects derive nectar for producing bioactive honey from the primary honey-source plants and augment their nutrition for foraging from the second population of plants; and
    b. a hive located within foraging distance of the cell and within which honey-producing insects of a species selected for collecting nectar from the first population are resident;
    wherein at least one of the populations has been artificially introduced to the cell to cohabit with the other population and individuals of the second population are located remote from the hive at distances selected for extending foraging range of the insects from the hive.

8. A honey-yielding environment according to claim 7, wherein the flora is controlled by way of at least one of (a) removing an unwanted plant species from the cell and (b) cultivating the introduced population in a viable quantity to grow in the cell.

9. A honey-yielding environment according to claim 7, wherein the cell is a bounded zone within the environment, within which the honey-producing insects are incentivized to forage by populating the bounded zone with plants of the first population, and wherein the bounded zone is maximized in territorial extent at least to correspond to the range of foraging of the honey-producing insects.

10. A honey-yielding environment according to claim 7, wherein the first population comprises plants of the species *Leptospermum polygalifolium* and subspecies thereof and wherein the nutrient from the second population comprises a protein.

* * * * *